United States Patent
Shirooka et al.

(10) Patent No.: US 10,232,885 B2
(45) Date of Patent: Mar. 19, 2019

(54) VEHICLE LOWER PORTION STRUCTURE

(71) Applicant: TOYOTA JIDOSHA KABUSHIKI KAISHA, Toyota-shi (JP)

(72) Inventors: Masakazu Shirooka, Toyota (JP); Yohsuke Matsumoto, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/232,396

(22) Filed: Aug. 9, 2016

(65) Prior Publication Data

US 2017/0050679 A1  Feb. 23, 2017

(30) Foreign Application Priority Data

Aug. 21, 2015 (JP) ................................. 2015-164047

(51) Int. Cl.
  *B62D 25/02* (2006.01)
  *B62D 25/04* (2006.01)
  *B62D 27/02* (2006.01)

(52) U.S. Cl.
  CPC .......... *B62D 25/025* (2013.01); *B62D 25/04* (2013.01); *B62D 27/023* (2013.01)

(58) Field of Classification Search
  CPC ..... B62D 25/025; B62D 25/04; B62D 27/023
  See application file for complete search history.

(56) References Cited

FOREIGN PATENT DOCUMENTS

| CN | 1618678 A | 5/2005 |
|----|-----------|--------|
| JP | 2005-145369 A | 6/2005 |
| JP | 2006-205901 | 8/2006 |
| JP | 2015-58749 | 3/2015 |
| WO | WO 2012/153425 A1 | 11/2012 |
| WO | WO 2015/040465 A1 | 3/2015 |

OTHER PUBLICATIONS

Chinese Office Action dated Mar. 19, 2018 in corresponding Patent Application No. 201610682464.4 (Partial English Translation only), citing document AO therein, 7 pages.

*Primary Examiner* — D Glenn Dayoan
*Assistant Examiner* — Melissa A Black
(74) *Attorney, Agent, or Firm* — Oblon, McClelland, Maier & Neustadt, L.L.P.

(57) ABSTRACT

A vehicle lower portion structure includes a front pillar reinforcement provided to a front pillar and having a lower end portion joined to a panel forming a rocker; and a rocker reinforcement provided to the rocker, joined to the panel, and having a front end that is disposed to face a rear end of the lower end portion from a vehicle rear side, wherein when a collision load is input from a vehicle front side to at least the front pillar, the rear end comes in contact with the front end.

5 Claims, 12 Drawing Sheets

VEHICLE LOWER PORTION STRUCTURE

INCORPORATION BY REFERENCE

The disclosure of Japanese Patent Application No. 2015-164047 filed on Aug. 21, 2015 including the specification, drawings and abstract is incorporated herein by reference in its entirety.

BACKGROUND

1. Technical Field

The present disclosure relates to a vehicle lower portion structure and, in particular, relates to a structure of a joint portion between a front pillar and a rocker.

2. Description of Related Art

In a vehicle side structure described in Japanese Patent Application Publication No. 2015-058749 (JP 2015-058749 A), a lower end portion of a front pillar outer reinforcement and a front end portion of a rocker outer reinforcement are disposed to overlap each other in a vehicle side view. As a related art, there is one described, for example, in Japanese Patent Application Publication No. 2006-205901 (JP 2006-205901 A).

In the vehicle side structure described above, the lower end portion of the front pillar outer reinforcement is joined (connected) to a side surface of the front end portion of the rocker outer reinforcement, for example, by spot welding. In the case of such a configuration, a collision load that is input from a vehicle front side to the front pillar outer reinforcement at the time of a small overlap collision or the like is transmitted to the rocker outer reinforcement mainly via spot welding points. As a result, there is a possibility that the transmission loss of the collision load may occur due to deformation of the respective reinforcements around the spot welding points, or the like.

SUMMARY

In consideration of the above-mentioned fact, it is an object of the present disclosure to provide a vehicle lower portion structure capable of efficiently transmitting to a rocker side a collision load that is input from a vehicle front side to a front pillar.

A vehicle lower portion structure according to an aspect of the present disclosure includes a front pillar reinforcement provided to a front pillar and having a lower end portion joined to a panel forming a rocker; and a rocker reinforcement provided to the rocker, joined to the panel, and having a front end, the front end disposed to face a rear end of the lower end portion from a vehicle rear side, wherein when a collision load is input from a vehicle front side to at least the front pillar, the rear end comes in contact with the front end According to the above-described aspect, when the collision load is input from the vehicle front side to at least the front pillar, the rear end of the lower end portion of the front pillar reinforcement comes in contact with the front end of the rocker reinforcement. As a result, the collision load is transmitted from the front pillar reinforcement to the rocker reinforcement in the state where the rear end of the lower end portion of the front pillar reinforcement and the front end of the rocker reinforcement are butted against each other in a vehicle longitudinal direction. With this configuration, compared to the configuration in which the collision load is transmitted from the front pillar side to the rocker side mainly via the spot welding points as in the vehicle side structure (prior art structure) described in the column of Related Art, the collision load can be efficiently transmitted to the rocker side.

In the above-described aspect, the front end and the rear end may normally be spaced apart from each other by a gap.

With this configuration, the rear end of the lower end portion of the front pillar reinforcement and the front end of the rocker reinforcement are normally spaced apart from each other by the gap. Consequently, compared to a configuration in which the gap is not provided, it is possible to reduce the required dimensional accuracy of the reinforcements, the required attaching accuracy of the reinforcements with respect to the panel of the rocker, and so on.

In the above-described aspect, a rear-end ridge line portion extending in a vehicle longitudinal direction may be formed on a rear end side of the lower end portion, the rocker reinforcement may be formed with a front-end ridge line portion extending in the vehicle longitudinal direction, and at least part of the rear-end ridge line portion side at the rear end and at least part of the front-end ridge line portion side at the front end may normally overlap each other in a vehicle front view.

With this configuration, when the collision load is input from the vehicle front side to at least the front pillar, at least part of the rear-end ridge line portion side of the lower end portion of the front pillar reinforcement at the rear end and at least part of the front-end ridge line portion side of the rocker reinforcement at the front end can be brought into contact with each other. Consequently, since the collision load is transmitted from the rear-end ridge line portion side of the front pillar reinforcement directly to the front-end ridge line portion side of the rocker reinforcement, it is possible to improve the transmission efficiency of the collision load.

In the above-described aspect, part of the front end and part of the rear end may normally cross each other in a vehicle front view.

With this configuration, compared to the configuration with no crossing as described above, the setting (design and manufacture of respective members, etc.) for contacting the rear end of the lower end portion of the front pillar reinforcement and the front end of the rocker reinforcement with each other as described above is facilitated.

As described above, in a vehicle lower portion structure according to the present disclosure, a collision load that is input from a vehicle front side to a front pillar can be efficiently transmitted to a rocker side.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinbelow, referring to FIGS. 1 to 14, a vehicle lower portion structure 10 according to an embodiment of the present disclosure will be described. Arrow FR, arrow LH, and arrow UP shown in the figures as appropriate respectively indicate a vehicle forward direction (travel direction), a vehicle leftward direction, and a vehicle upward direction. Hereinbelow, when a description is given using a direction of merely forward or rearward, a direction of merely leftward or rightward, or a direction of merely upward or downward, it indicates forward or rearward in a vehicle longitudinal direction, leftward or rightward in a vehicle transverse direction (vehicle width direction), or upward or downward in a vehicle vertical direction unless otherwise stated.

Figure 1:
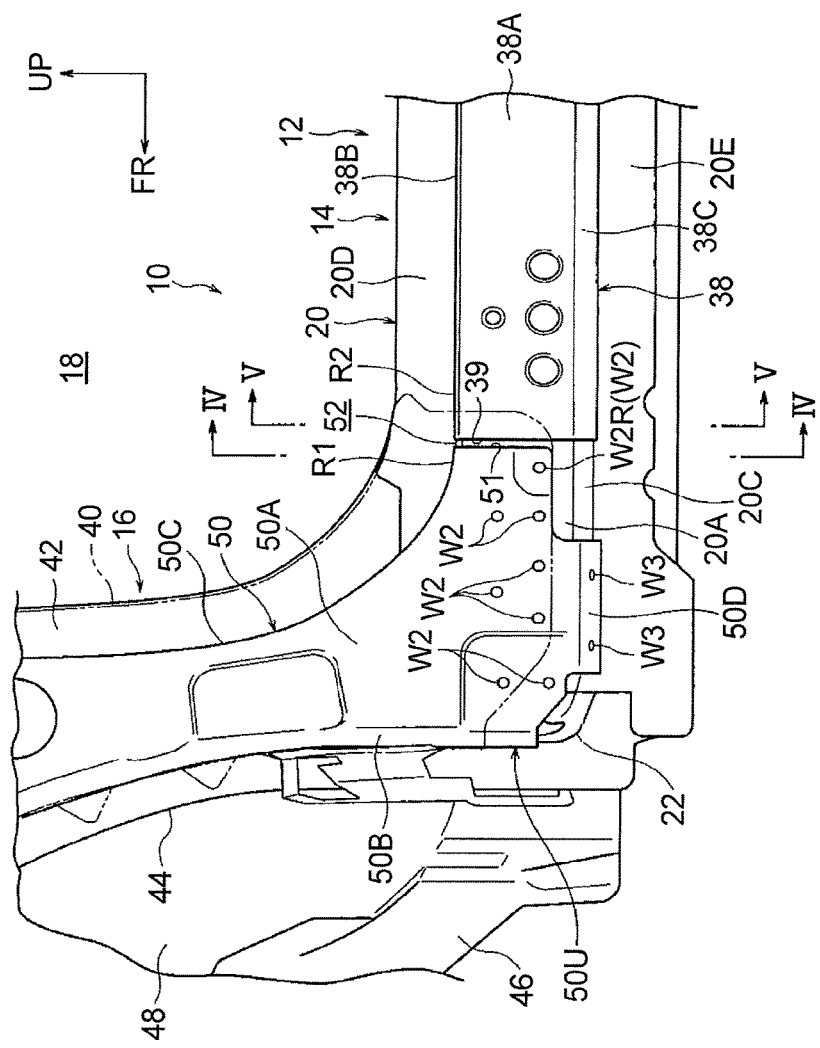
FIG. 1 is a side view showing a partial configuration of a left side portion of a vehicle to which a vehicle lower portion structure according to an embodiment of the present disclosure is applied.

(Overall Configuration) The overall configuration of the vehicle lower portion structure 10 according to this embodiment will first be described and then the main part of this embodiment will be described. As shown in FIG. 1, a vehicle 12 (automobile) to which the vehicle lower portion structure 10 according to this embodiment is applied includes a rocker 14 extending in the vehicle longitudinal direction at a lower portion of a vehicle body side portion and an A-pillar (front pillar) 16 extending toward the vehicle upper side from a front end portion of the rocker 14. The rocker 14 and the A-pillar 16 are closed cross-section members constituting a skeleton of a vehicle body and form, jointly with a roof side rail and a center pillar, not shown, a door opening portion 18 for an occupant to get on and off. In the vehicle 12, the configurations of a left side portion and a right side portion of the vehicle body are the same except that they are bilaterally symmetrical, and therefore, hereinbelow, only the configuration of the left side portion will be described, while a description of the configuration of the right side portion will be omitted.

Figure 4:
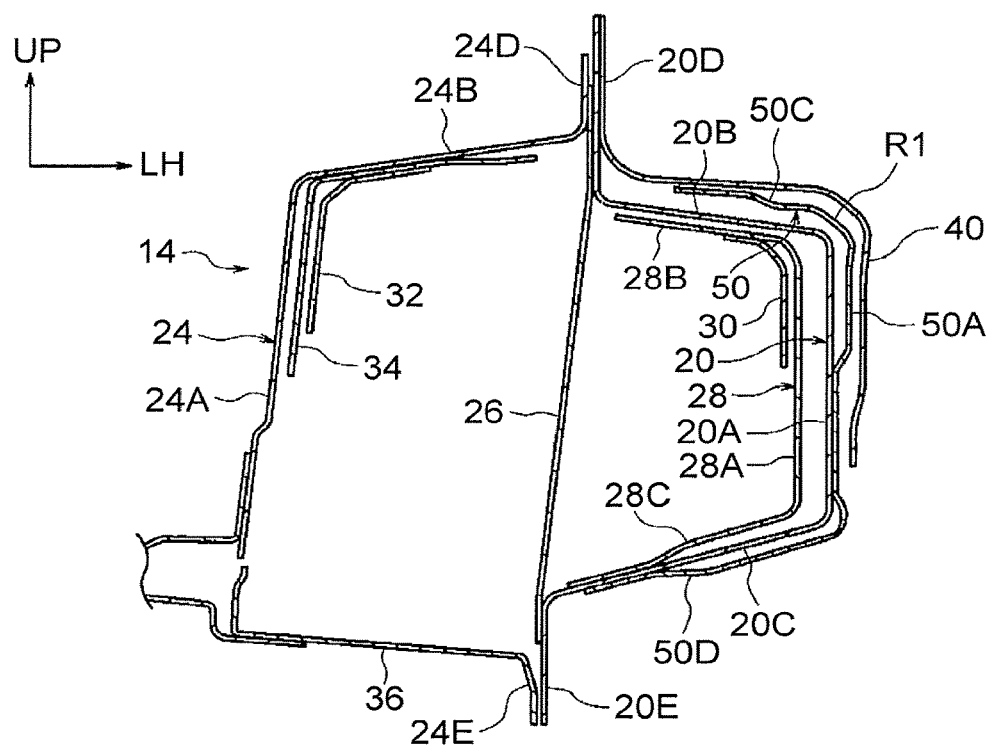
FIG. 4 is an enlarged cross-sectional view showing on an enlarged scale a cross section taken along line IV-IV of FIG. 1.
Figure 5:
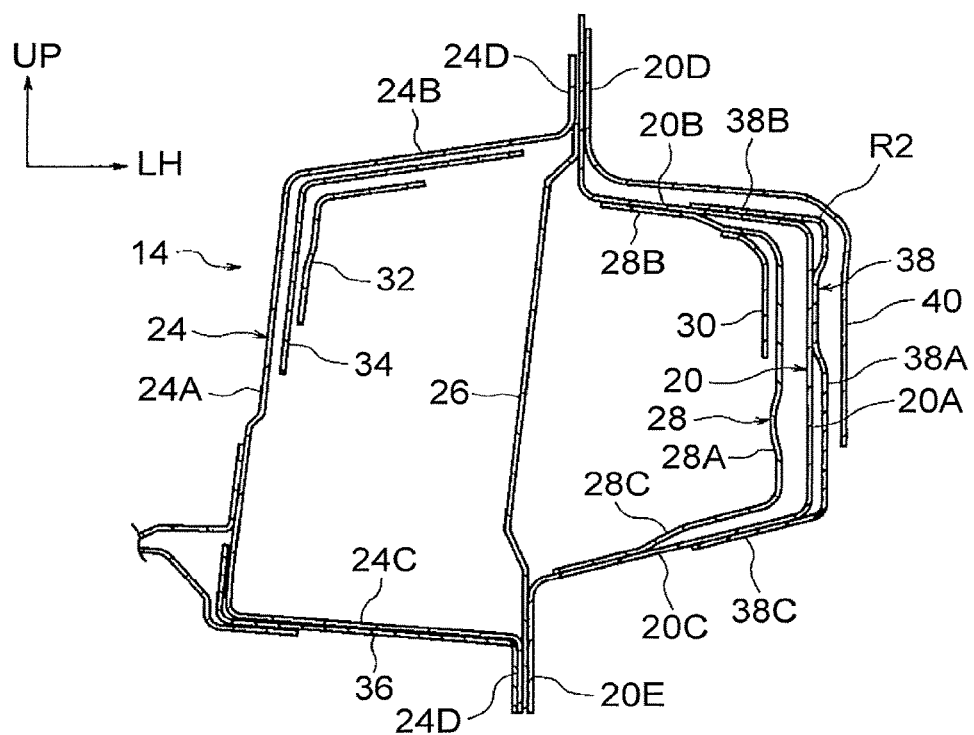
FIG. 5 is an enlarged cross-sectional view showing on an enlarged scale a cross section taken along line V-V of FIG. 1.

As shown in FIGS. 1 to 5, the rocker 14 includes a rocker outer panel 20. The rocker outer panel 20 corresponds to "a panel forming a rocker" in the present disclosure. The rocker outer panel 20 is in the form of a metal plate, which is formed in an elongated shape extending in the vehicle longitudinal direction and has a hat shape in cross section that is open inward in the vehicle width direction in a vehicle front view. Specifically, as shown in FIGS. 4 and 5, the rocker outer panel 20 includes a side wall portion 20A disposed with its thickness direction parallel to the vehicle width direction, an upper wall portion 20B and a lower wall portion 20C respectively extending inward in the vehicle width direction from vehicle upper and lower ends of the side wall portion 20A, a flange 20D extending toward the vehicle upper side from an inner end in the vehicle width direction of the upper wall portion 20B, and a flange 20E extending toward the vehicle lower side from an inner end in the vehicle width direction of the lower wall portion 20C. A front end opening portion of the rocker outer panel 20 is closed by a bulk member 22 joined to the inner side of a front end portion of the rocker outer panel 20.

As shown in FIGS. 4 and 5, the rocker 14 includes a rocker inner panel 24 (not shown in FIG. 3) disposed on the inner side in the vehicle width direction of the rocker outer panel 20. The rocker inner panel 24 is in the form of a metal plate, which is formed in an elongated shape extending in the vehicle longitudinal direction and has a hat shape in cross section that is open outward in the vehicle width direction in a vehicle front view. Specifically, the rocker inner panel 24 includes a side wall portion 24A disposed with its thickness direction parallel to the vehicle width direction, an upper wall portion 24B and a lower wall portion 24C respectively extending outward in the vehicle width direction from vehicle upper and lower ends of the side wall portion 24A, a flange 24D extending toward the vehicle upper side from an inner end in the vehicle width direction of the upper wall portion 24B, and a flange 24E extending toward the vehicle lower side from an inner end in the vehicle width direction of the lower wall portion 24C.

The flanges 20D and 20E of the rocker outer panel 20 and the flanges 24D and 24E of the rocker inner panel 24 are joined (connected) together by a means such as spot welding. Consequently, the rocker outer panel 20 and the rocker inner panel 24 jointly form a closed cross section extending in the vehicle longitudinal direction. A partition panel 26 in the form of a metal plate is interposed between the rocker outer panel 20 and the rocker inner panel 24. The partition panel 26 is formed in a flat plate shape, disposed with its thickness direction parallel to the vehicle width direction, and joined (connected) to the flanges 20D and 20E of the rocker outer panel 20 and to the flanges 24D and 24E of the rocker inner panel 24 by a means such as spot welding.

An inner reinforcement 28 in the form of a metal plate is disposed on the inner side of the rocker outer panel 20. The inner reinforcement 28 is formed in a generally U-shape in cross section that is open inward in the vehicle width direction in a vehicle front view. Specifically, the inner reinforcement 28 includes a side wall portion 28A disposed with its thickness direction parallel to the vehicle width direction, and an upper wall portion 28B and a lower wall portion 28C respectively extending inward in the vehicle width direction from vehicle upper and lower ends of the side wall portion 28A. The side wall portion 28A, the upper wall portion 28B, and the lower wall portion 28C are respectively joined to the side wall portion 20A, the upper wall portion 20B, and the lower wall portion 20C of the rocker outer panel 20 by a means such as spot welding.

Further, a reinforcing panel 30 in the form of a metal plate is disposed at an upper corner on the inner side of the inner reinforcement 28. The reinforcing panel 30 is formed in a generally inverted L-shape in a vehicle front view and joined to the side wall portion 28A and the upper wall portion 28B of the inner reinforcement 28 by a means such as spot welding. Although a detailed description is omitted, reinforcing panels 32 and 34 each having a generally L-shape in cross section are joined to the rocker inner panel 24 at an upper corner on the inner side of the rocker inner panel 24, while a lower reinforcement 36 is joined to a lower surface of the lower wall portion 24C of the rocker inner panel 24.

Further, a rocker outer reinforcement 38 (hereinafter referred to as a "rocker outer RF 38") is disposed on the outer side in the vehicle width direction of the rocker outer panel 20. The rocker outer RF 38 corresponds to "a rocker reinforcement" in the present disclosure. The rocker outer RF 38 is a high-strength metal plate member extending in a longitudinal direction of the rocker 14 and reinforcing the rocker 14 and is joined in an overlapping manner to the rocker outer panel 20 on the outer side in the vehicle width direction of the rocker outer panel 20.

The rocker outer RF 38 is formed in a generally U-shape in cross section that is open inward in the vehicle width direction in a vehicle front view. Specifically, as shown in FIG. 5, the rocker outer RF 38 includes a side wall portion 38A disposed with its thickness direction parallel to the vehicle width direction, and an upper wall portion 38B and a lower wall portion 38C respectively extending inward in the vehicle width direction from vehicle upper and lower ends of the side wall portion 38A.

The side wall portion 38A overlaps the side wall portion 20A of the rocker outer panel 20 on the outer side in the vehicle width direction of the rocker outer panel 20 and is joined to the side wall portion 20A by a means such as spot welding. The upper wall portion 38B overlaps the upper wall portion 20B of the rocker outer panel 20 on the vehicle upper side of the rocker outer panel 20 and is joined to the upper wall portion 20B by a means such as spot welding. The lower wall portion 38C overlaps the lower wall portion 20C of the rocker outer panel 20 on the vehicle lower side of the rocker outer panel 20 and is joined to the lower wall portion 20C by a means such as spot welding. A front end (front edge) 39 of the rocker outer RF 38 is formed by front ends of the side wall portion 38A, the upper wall portion 38B, and the lower wall portion 38C and is located on the vehicle rear side compared to a front end of the rocker outer panel 20.

On the other hand, the A-pillar 16 includes a side outer panel 40 in the form of a metal plate forming an outer wall portion in the vehicle width direction of the A-pillar 16. The side outer panel 40 is formed in a hat shape in cross section that is open inward in the vehicle width direction in a plan view. An A-pillar inner panel 42 in the form of a metal plate is joined to the side outer panel 40 on the inner side in the vehicle width direction of the side outer panel 40. Consequently, the A-pillar 16 has a closed cross section. A front wheel house 44 is formed on the vehicle front side of the A-pillar 16 and a front wheel (not shown) is disposed in the front wheel house 44. In FIGS. 1, 8, 11, and 12, symbol 46 is assigned to a front side member and symbol 48 is assigned to a front fender apron.

A front pillar reinforcement 50 (hereinafter referred to as an "A-pillar RF 50") is disposed in the closed cross section of the A-pillar 16. The A-pillar RF 50 is a high-strength metal plate member extending in a longitudinal direction of the A-pillar 16 and reinforcing the A-pillar 16. The A-pillar RF 50 has a lower end portion 50U joined to the front end portion of the rocker outer panel 20 and extends toward the vehicle upper side from the front end portion of the rocker outer panel 20. The A-pillar RF 50 is formed in a generally U-shape in cross section that is open inward in the vehicle width direction as seen from the vehicle vertical direction.

Specifically, the A-pillar RF 50 includes a side wall portion 50A disposed with its thickness direction parallel to the vehicle width direction, a front wall portion 50B and a rear wall portion 50C respectively extending inward in the vehicle width direction from vehicle front and rear ends of the side wall portion 50A, and a lower wall portion 50D extending inward in the vehicle width direction from a lower end of the side wall portion 50A. A lower end portion of the front wall portion 50B overlaps a front surface of the bulk member 22 and is joined to the bulk member 22 at a plurality of front-surface welding points W1 (see FIG. 7) by spot welding.

A lower side of the rear wall portion 50C is curved toward the vehicle rear side as going toward the vehicle lower side, while a lower side of the side wall portion 50A is configured such that its dimension in the vehicle longitudinal direction increases toward the vehicle rear side as going toward the vehicle lower side. A lower end portion (rear end portion) of the rear wall portion 50C extends toward the vehicle rear side along an upper surface of the upper wall portion 20B of the rocker outer panel 20. A lower end portion of the side wall portion 50A overlaps a front end portion of the side wall portion 20A of the rocker outer panel 20 on the outer side in the vehicle width direction of the rocker outer panel 20 and is joined to the side wall portion 20A at a plurality of side-surface welding points W2 (see FIGS. 1, 2, 6, and 7) by spot welding.

The lower wall portion 50D overlaps the lower wall portion 20C of the rocker outer panel 20 on the vehicle lower side of the rocker outer panel 20 and is joined to the lower wall portion 20C at a plurality of lower-surface welding points W3 (see FIG. 1) by spot welding. A rear end (rear edge) 51 of the lower end portion 50U of the A-pillar RF 50 is formed by rear ends of the side wall portion 50A and the rear wall portion 50C. In FIGS. 1, 2, 6, 7, and so on, welding points other than the front-surface welding points W1, the side-surface welding points W2, and the lower-surface welding points W3 are not shown in terms of better understanding of the drawings. In the following description, the welding points described above may also be referred to simply as welding points.

(Main Part Of This Embodiment) Next, the main part of this embodiment will be described. In this embodiment, the front end 39 of the rocker outer RF 38 is disposed so as to face the rear end 51 of the lower end portion 50U of the A-pillar RF 50 (hereinafter may also be referred to simply as "the rear end 51 of the A-pillar RF 50") from the vehicle rear side. The word "face" is synonymous with the word "be opposite to". That is, the whole or part of (herein part of) the front end 39 of the rocker outer RF 38 normally overlaps the rear end 51 of the A-pillar RF 50 in a vehicle front view.

The front end 39 of the rocker outer RF 38 and the rear end 51 of the A-pillar RF 50 are normally spaced apart from each other by a gap 52 in the vehicle longitudinal direction. The gap 52 is set to a dimension of, for example, about 5 mm in the vehicle longitudinal direction.

In this embodiment, as shown in FIGS. 1, 2, 4, 6, and 7, a rear-end ridge line portion R1 extending in the vehicle longitudinal direction is formed at an upper corner on the rear end 51 side of the A-pillar RF 50. The rear-end ridge line portion R1 is a bent portion of an L-shape in cross section formed between the side wall portion 50A and the rear wall portion 50C. Likewise, as shown in FIGS. 1, 2, 5, 6, and 7, a front-end ridge line portion R2 extending in the vehicle longitudinal direction is formed at an upper corner on the front end 39 side of the rocker outer RF 38. The front-end ridge line portion R2 is a bent portion of an L-shape in cross section formed between the side wall portion 38A and the upper wall portion 38B and is formed, not only on the front end 39 side of the rocker outer RF 38, but along the entire length of the rocker outer RF 38. In this embodiment, at least part of the rear-end ridge line portion R1 side of the A-pillar RF 50 at the rear end 51 and at least part of the front-end ridge line portion R2 side of the rocker outer RF 38 at the front end 39 normally overlap each other in a vehicle front view.

Herein, "the rear-end ridge line portion R1 side of the A-pillar RF 50 at the rear end 51" is, for example, a portion, located on the upper side with respect to the middle in the vehicle vertical direction and on the outer side with respect to the middle in the vehicle width direction, of the rear end 51. Likewise, "the front-end ridge line portion R2 side of the rocker outer RF 38 at the front end 39" is, for example, a portion, located on the upper side with respect to the middle in the vehicle vertical direction and on the outer side with respect to the middle in the vehicle width direction, of the front end 39.

Figure 6:
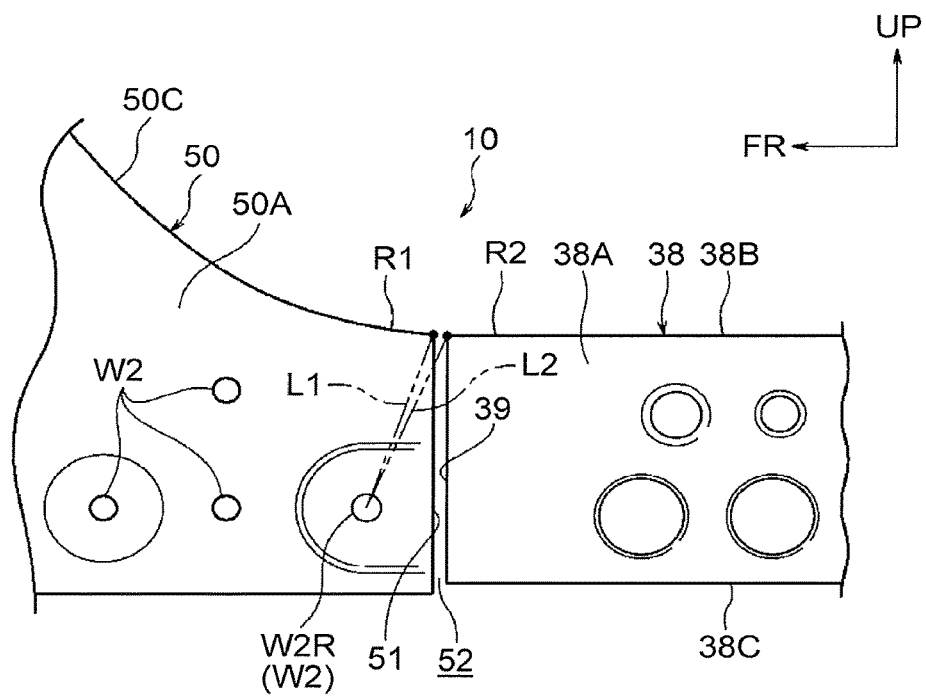
FIG. 6 is a side view showing a partial configuration of a front pillar reinforcement and a rocker outer reinforcement provided in the vehicle lower portion structure.
Figure 7:
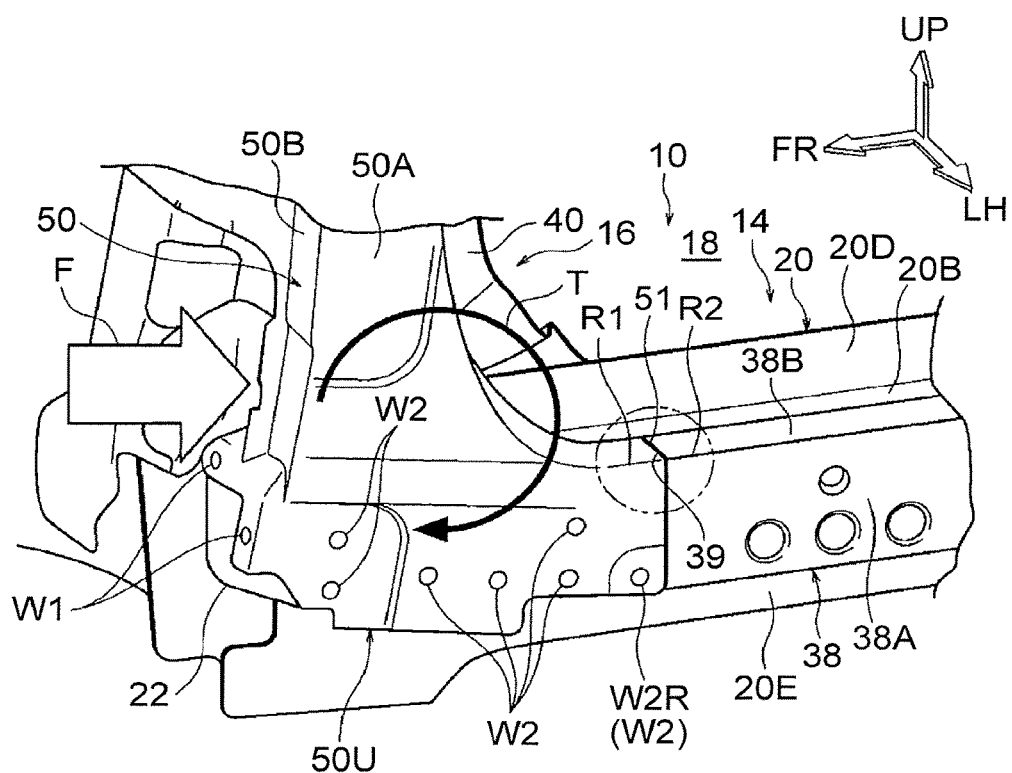
FIG. 7 is a perspective view for explaining a state when a collision load is input from a vehicle front side to a front pillar of the vehicle lower portion structure.

Further, in this embodiment, among the plurality of side-surface welding points W2, the side-surface welding point W2 located on the vehicle rearmost side (hereinafter referred to as "the side-surface welding point W2R") is located on the rear end 51 side and the lower portion side (herein the lower end side) of the lower end portion 50U of the A-pillar RF 50. As shown in FIG. 6, assuming that the distance between a rear end of the rear-end ridge line portion R1 and the side-surface welding point W2R is L1 and that the distance between a front end of the front-end ridge line portion R2 and the side-surface welding point W2R is L2, a relationship of L1≤L2 is established. That is, the arrangement of the gap 52, the side-surface welding point W2R, the rear-end ridge line portion R1, and the front-end ridge line portion R2 is set so that the relationship of L1≤L2 is established.

Herein, in this embodiment, when the vehicle 12 comes into a head-on collision (e.g. a small overlap collision), the front wheel (not shown) is moved toward the vehicle rear side to interfere with (abut against) the front end of the rocker 14 and the A-pillar 16. In this case, a collision load F (see FIG. 7) is input from the vehicle front side mainly to a portion, slightly above the rocker 14, of the A-pillar 16 via the front wheel. As a result, a clockwise moment as seen from the vehicle left side acts on the A-pillar 16 so that the A-pillar RF 50 is rotationally deformed toward the vehicle rear side about the axis in the vehicle width direction centering on the lower end side of the A-pillar RF 50 (see arrow T in FIG. 7). In this event, the rear end side of the lower end portion 50U of the A-pillar RF 50 is rotationally deformed about the side-surface welding point W2R located near the rear end 51. This causes the upper portion side of the rear end 51 of the A-pillar RF 50 to contact (abut against: interfere with) the upper portion side of the front end 39 of the rocker outer RF 38. That is, in this embodiment, it is configured that the rear end 51 of the A-pillar RF 50 comes in contact with the front end 39 of the rocker outer RF 38 even by the slight deformation of the A-pillar 16 which occurs when a collision load is input from the vehicle front side to the A-pillar 16.

Further, in this case, it is configured that at least part of the rear-end ridge line portion R1 side of the A-pillar RF 50 at the rear end 51 and at least part of the front-end ridge line portion R2 side of the rocker outer RF 38 at the front end 39 contact (abut against: interfere with) each other. By the contact between the rear end 51 of the A-pillar RF 50 and the front end 39 of the rocker outer RF 38, the rear end 51 and the front end 39 come into a state of being butted against each other in the vehicle longitudinal direction.

(Actions And Effects) Next, the actions and effects of this embodiment will be described.

In this embodiment, when a collision load F is input from the vehicle front side to the A-pillar 16 due to a head-on collision (e.g. a small overlap collision) of the vehicle 12, the upper portion side of the rear end 51 of the A-pillar RF 50 contacts the upper portion side of the front end 39 of the rocker outer RF 38. As a result, the collision load is transmitted from the A-pillar RF 50 to the rocker outer RF 38 in the state where the rear end 51 and the front end 39 are butted against each other in the vehicle longitudinal direction. Accordingly, compared to the configuration in which the collision load is transmitted mainly via the spot welding points as in the prior art structure described in the column of Related Art, the collision load can be efficiently transmitted to the rocker 14 side. As a result, the deformation of the vehicle body can be suppressed more than the prior art structure.

Further, in this embodiment, the rear-end ridge line portion R1 extending in the vehicle longitudinal direction is formed on the rear end 51 side of the A-pillar RF 50, while the front-end ridge line portion R2 extending in the vehicle longitudinal direction is formed on the front end 39 side of the rocker outer RF 38. At least part of the rear-end ridge line portion R1 side at the rear end 51 and at least part of the front-end ridge line portion R2 side at the front end 39 normally overlap each other in a vehicle front view. When the collision load F is input from the vehicle front side to the A-pillar 16, at least part of the rear-end ridge line portion R1 side of the A-pillar RF 50 at the rear end 51 and at least part of the front-end ridge line portion R2 side of the rocker outer RF 38 at the front end 39 come in contact with each other.

Consequently, the collision load is transmitted from the rear-end ridge line portion R1 side of the A-pillar RF 50 directly to the front-end ridge line portion R2 side of the rocker outer RF 38. Since the A-pillar RF 50 and the rocker outer RF 38 are increased in the rigidity in the vehicle longitudinal direction on the rear-end ridge line portion R1 side and the front-end ridge line portion R2 side, the transmission loss of the collision load is reduced by the transmission of the collision load via the rear-end ridge line portion R1 side and the front-end ridge line portion R2 side. Further, since the rear-end ridge line portion R1 side of the A-pillar RF 50 at the rear end 51 receives a high reaction force from the front-end ridge line portion R2 side of the rocker outer RF 38 at the front end 39, the rotational deformation amount of the A-pillar 16 is reduced. Consequently, the deformation amount of the vehicle body can be effectively reduced Since, as described above, the collision load is transmitted by the contact between the rear end 51 of the A-pillar RF 50 and the front end 39 of the rocker outer RF 38, a shearing force acting on the welding points such as the side-surface welding points W2 is reduced between the reinforcements 38 and 50.

Further, in this embodiment, since it is not the configuration in which the lower end portion of the A-pillar RF 50 and the front end portion of the rocker outer RF 38 overlap each other in a vehicle side view as in the prior art structure, for example, the dimension of the rocker outer RF 38 in the vehicle longitudinal direction can be set to be shorter than the prior art structure. Consequently, the vehicle body can be reduced in weight compared to the prior art structure.

Figure 2:
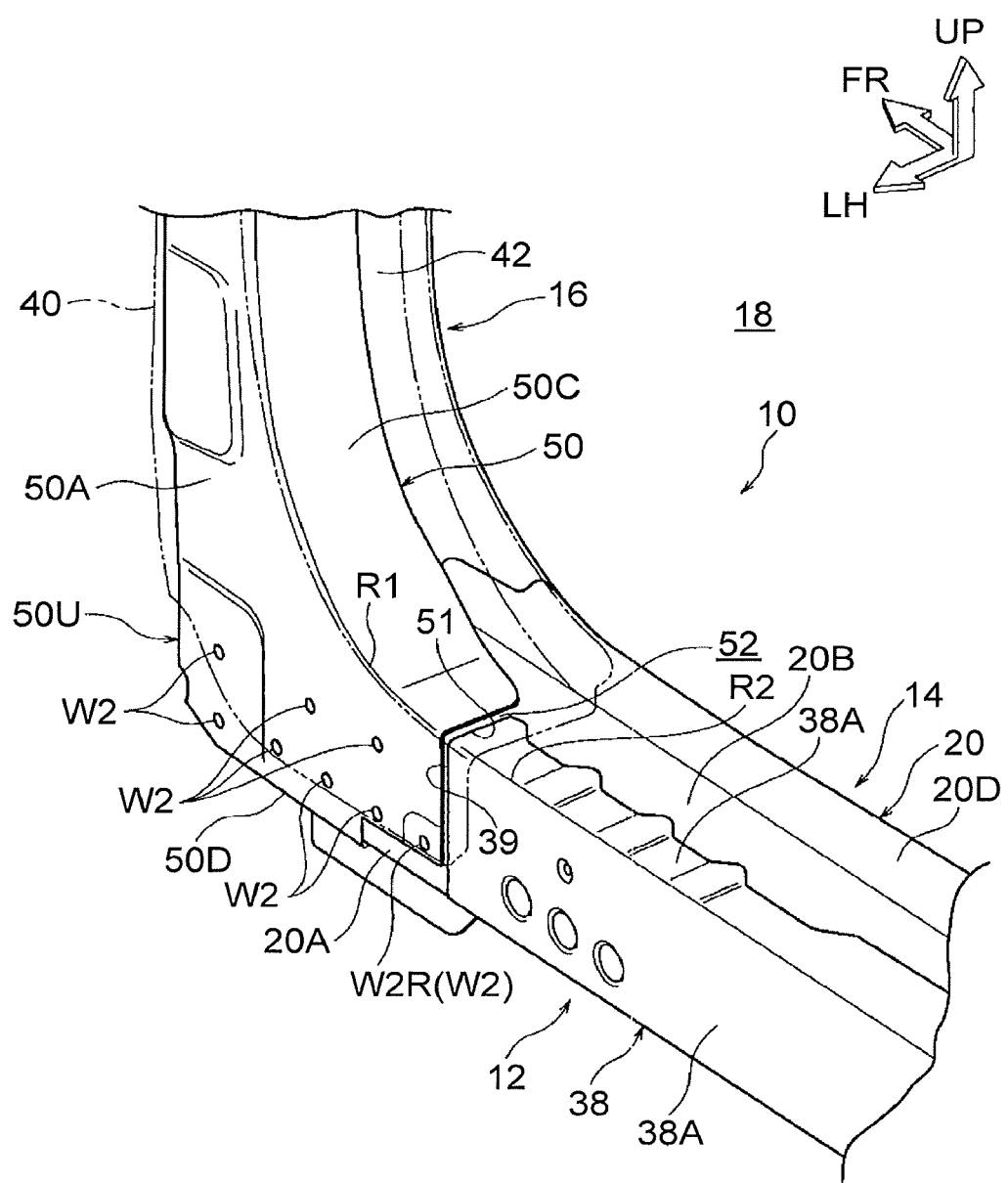
FIG. 2 is a perspective view in which part of the configuration shown in FIG. 1 is seen from a vehicle rear obliquely upper side.
Figure 3:
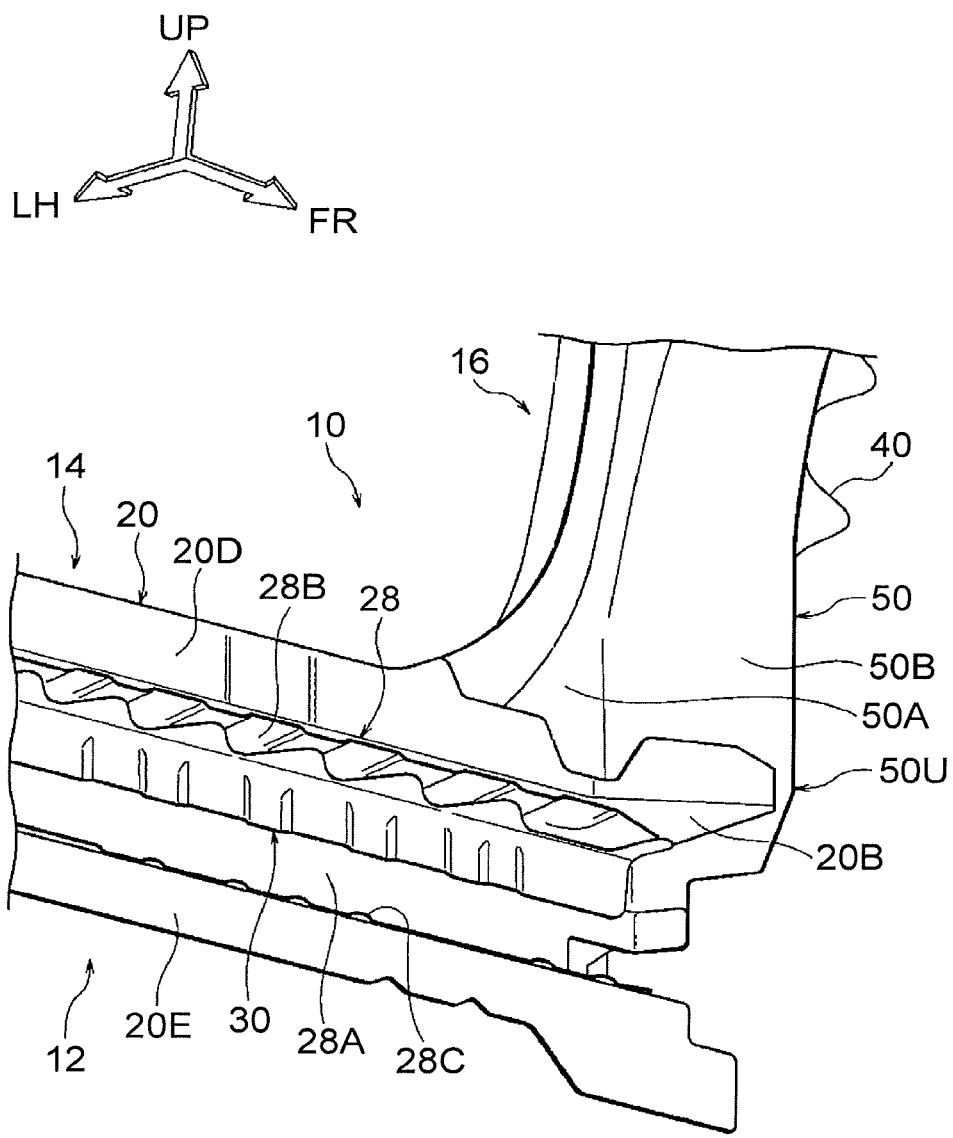
FIG. 3 is a perspective view in which part of the configuration shown in FIG. 1 is seen from a vehicle rear obliquely lower side.

Further, in this embodiment, as shown in FIGS. 1, 2, and 6, the rear end 51 of the A-pillar RF 50 and the front end 39 of the rocker outer RF 38 are normally spaced apart from each other by the gap 52. Consequently, compared to a configuration in which the gap 52 is not provided, it is possible to reduce the required dimensional accuracy of the reinforcements 38 and 50, the required attaching accuracy of the reinforcements 38 and 50 with respect to the rocker outer panel 20, and so on. As a result, it is possible to facilitate the manufacture of the reinforcements 38 and 50 and the operation of attaching the reinforcements 38 and 50 to the rocker outer panel 20.

As a measure for reducing the deformation amount of the vehicle body, for example, it may be considered to improve the joining rigidity between the reinforcements 38 and 50 by adding bulks (reinforcing members) around a joining portion between the reinforcements 38 and 50 or by increasing the number of welding points between the reinforcements 38 and 50. However, if the bulks are added, the manufacturing cost and the mass of the vehicle body increase. On the other hand, if the number of welding points is increased, the tact time and the use of facilities increase, resulting in an increase in the manufacturing cost.

In this regard, in this embodiment, the collision load is transmitted from the A-pillar RF 50 directly to the rocker outer RF 38 by the contact (interference) between the rear-end ridge line portion R1 side of the A-pillar RF 50 at the rear end 51 and the front-end ridge line portion R2 side of the rocker outer RF 38 at the front end 39. Consequently, the transmission loss of the collision load is reduced and the load to the welding points between the reinforcements 38 and 50 is reduced so that the deformation amount of the vehicle body is reduced. As a result, the measure described above is not required, thus contributing to a decrease in the manufacturing cost and in the mass of the vehicle body.

Figure 8:
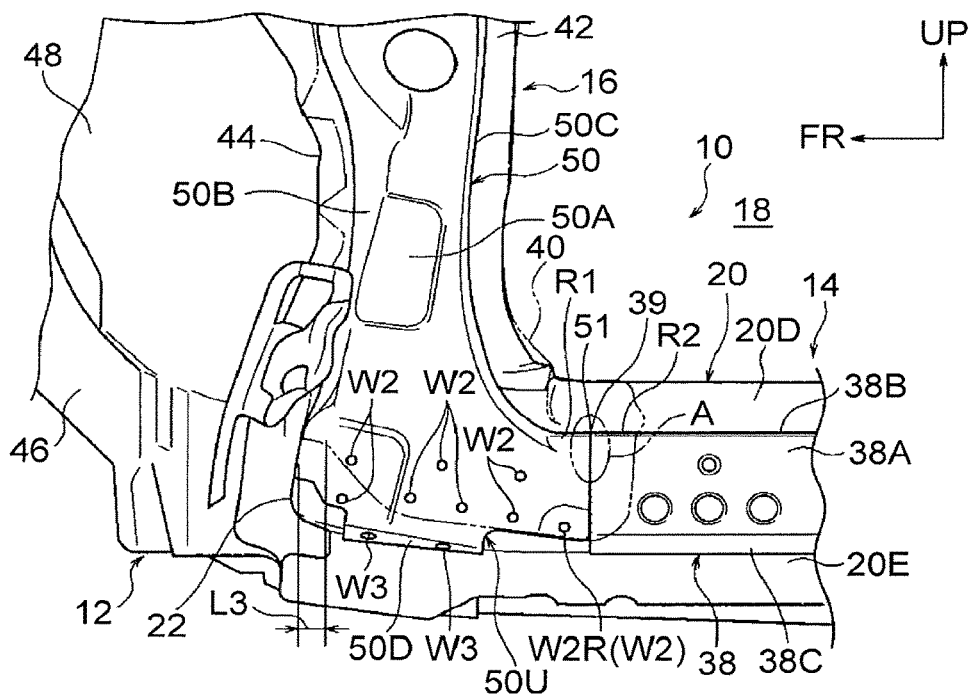
FIG. 8 is a side view showing a state in the middle of a small overlap collision based on a CAE analysis performed for the embodiment of the present disclosure.
Figure 9:
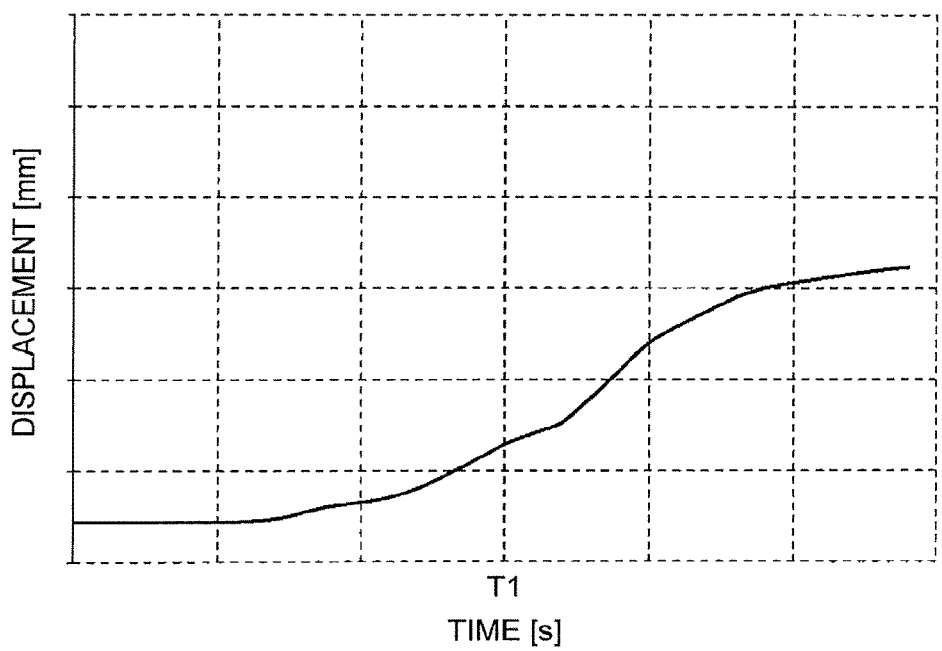
FIG. 9 is a diagram showing the relationship between the displacement of the front pillar and the time based on the CAE analysis in the embodiment of the present disclosure.
Figure 10:
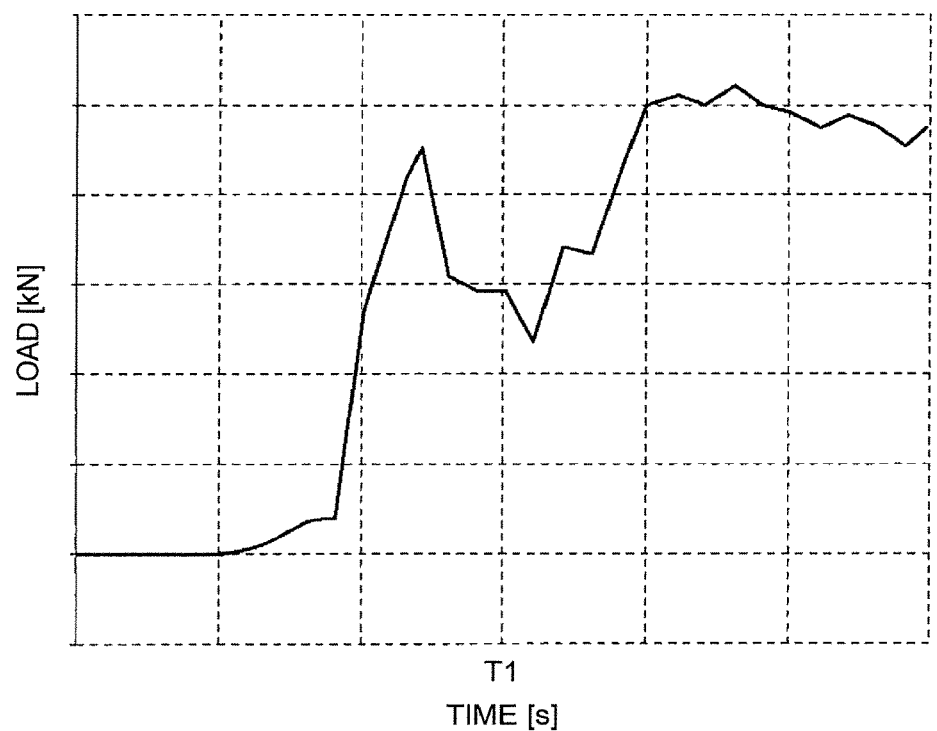
FIG. 10 is a diagram showing the relationship between the load applied to a lower end portion of the front pillar reinforcement and the time based on the CAE analysis in the embodiment of the present disclosure.

Next, the analysis results of a small overlap collision based on a CAE (computer aided engineering) analysis performed for the vehicle lower portion structure 10 according to this embodiment will be described. FIG. 8 is a side view showing a state in the middle of a small overlap collision based on a CAE analysis performed for the vehicle lower portion structure 10. FIG. 9 is a diagram showing the relationship between the displacement of the A-pillar 16 and the time based on the CAE analysis, while FIG. 10 is a diagram showing the relationship between the load applied to the lower end portion of the A-pillar RF 50 and the time based on the CAE analysis.

As shown in FIG. 8, in the vehicle lower portion structure 10, in the middle of the small overlap collision based on the CAE analysis, a retreat amount L3 of the front end of the A-pillar 16 relative to the front end of the rocker 14 is reduced. Further, as shown in FIG. 9, an increase in the retreat amount of the front end of the A-pillar 16 is reduced after a time point T1 at which a predetermined time (e.g. 15 msec) has elapsed from the occurrence of the collision. Further, as shown in FIG. 10, the load applied to the lower end portion of the A-pillar RF 50 is largely increased after the time point T1. This is considered to be because the A-pillar RF 50 has received a high reaction force from the rocker outer RF 38 by the contact between the rear end 51 of the A-pillar RF 50 and the front end 39 of the rocker outer RF 38 (see a region A surrounded by a two-dot chain line in FIG. 8). From the above, it has been confirmed that the deformation amount of the vehicle body such as the retreat amount of the A-pillar RF 50 is reduced in the vehicle lower portion structure 10.

Figure 11:
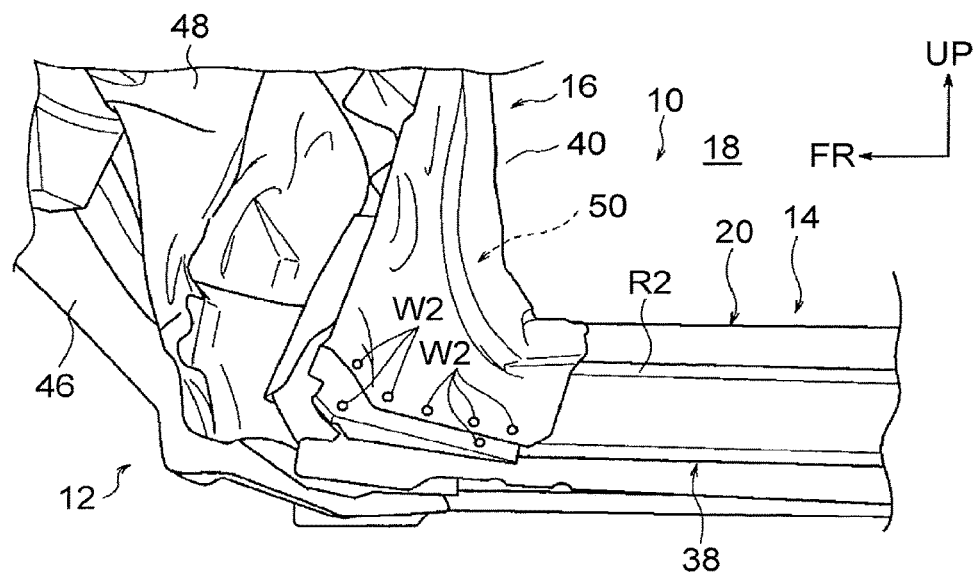
FIG. 11 is a side view showing a state after the end of the collision based on the CAE analysis in the embodiment of the present disclosure.
Figure 12:
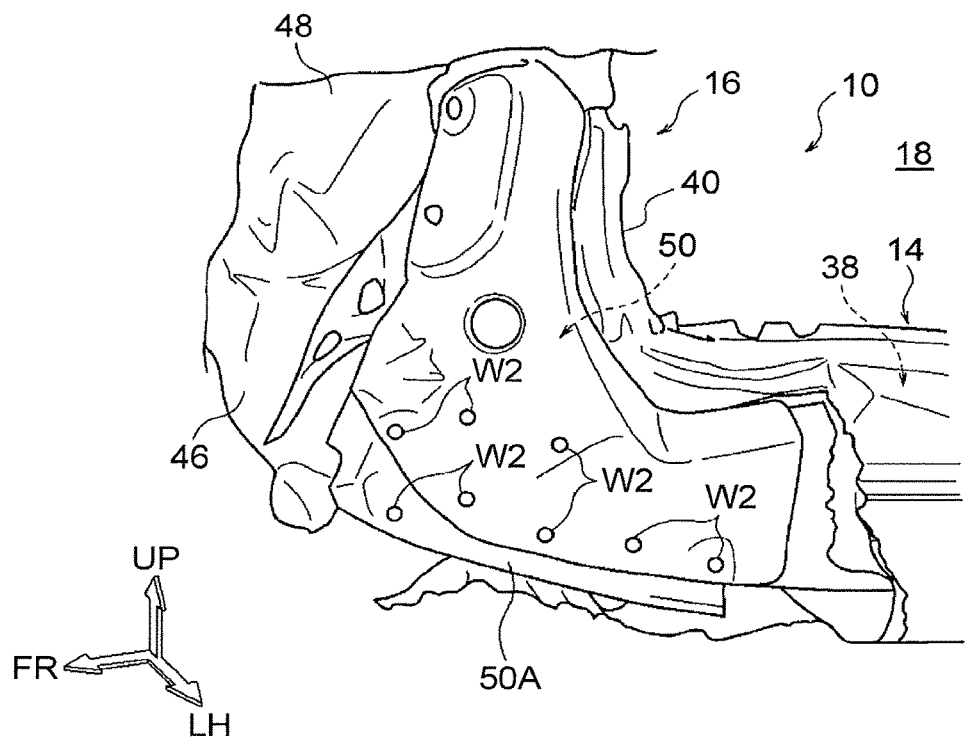
FIG. 12 is a perspective view showing the results of a small overlap collision test using an actual vehicle to which the same structure as the embodiment of the present disclosure is applied.
Figure 13:
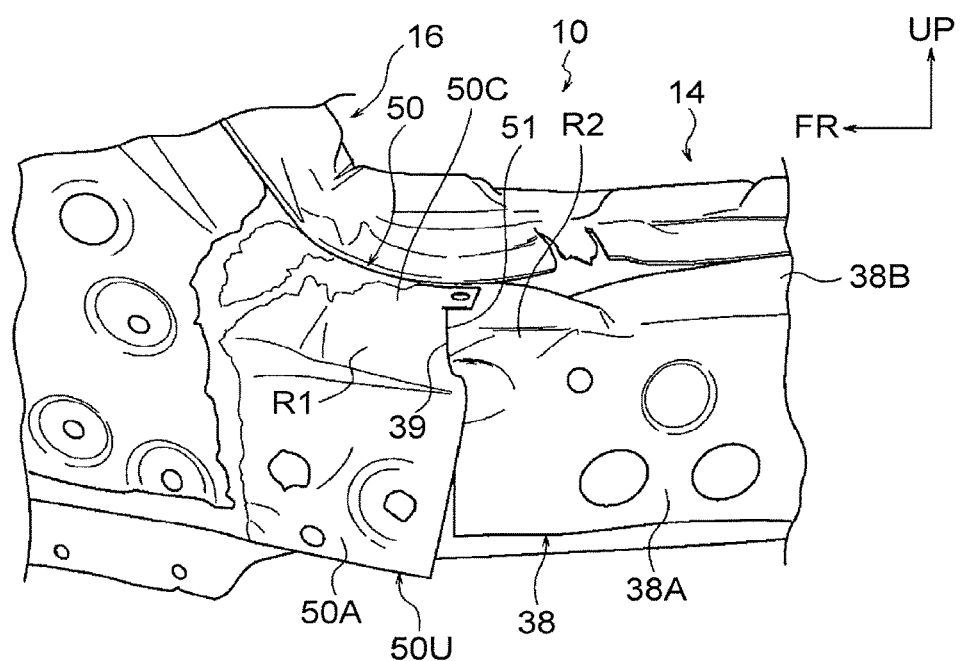
FIG. 13 is a perspective view showing a state in which a rear end of a lower end portion of a front pillar reinforcement comes in contact with a front end of a rocker outer reinforcement in a small overlap collision test using an actual vehicle to which the same structure as the embodiment of the present disclosure is applied.
Figure 14:
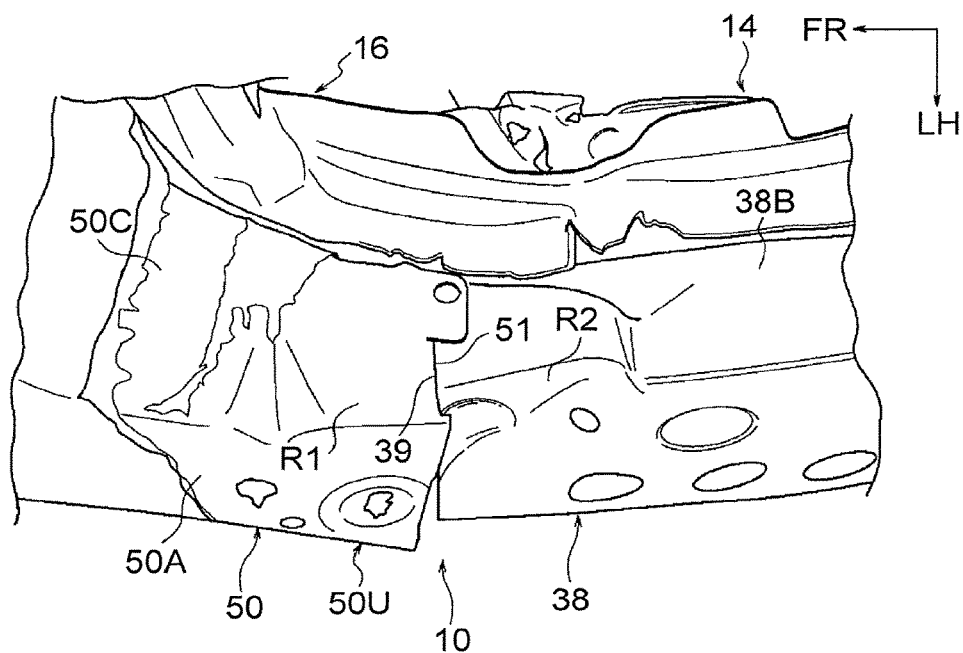
FIG. 14 is a perspective view in which the configuration shown in FIG. 13 is seen from an angle different from that of FIG. 13.

Next, a state after the end of the collision based on the CAE analysis and the results of a small overlap collision test using an actual vehicle will be described. FIG. 11 is a side view showing a state after the end of the collision based on the CAE analysis in the vehicle lower portion structure 10. FIG. 12 is a perspective view showing the results of a small overlap collision test using an actual vehicle to which the same structure as the vehicle lower portion structure 10 is applied. FIGS. 13 and 14 are perspective views showing a state in which the rear end 51 of the A-pillar RF 50 interferes with the front end 39 of the rocker outer RF 38 in a small overlap collision test using an actual vehicle to which the same structure as the vehicle lower portion structure 10 is applied.

In either of the CAE analysis results shown in FIG. 11 and the small overlap collision test results shown in FIG. 12, in the vehicle lower portion structure 10, the retreat amount of the A-pillar RF 50 is reduced and the front end portion of the rocker 14 does not protrude to the vehicle front side of the A-pillar RF 50. Further, it has been confirmed that the welding points W between the A-pillar RF 50 and the rocker outer RF 38 are not broken.

As shown in FIGS. 13 and 14, in the vehicle lower portion structure 10, the rear-end ridge line portion R1 side of the A-pillar RF 50 at the rear end 51 and the front-end ridge line portion R2 side of the rocker outer RF 38 at the front end 39 strongly interfere with each other. It is presumed that, by this strong interference, the joining portion strength between the A-pillar RF 50 and the rocker outer RF 38 is increased. As described above, the same results have been obtained in the CAE analysis and the actual small overlap collision test, resulting in that the vehicle body deformation amount reducing effect by the vehicle lower portion structure 10 has been confirmed.

Figure 15:
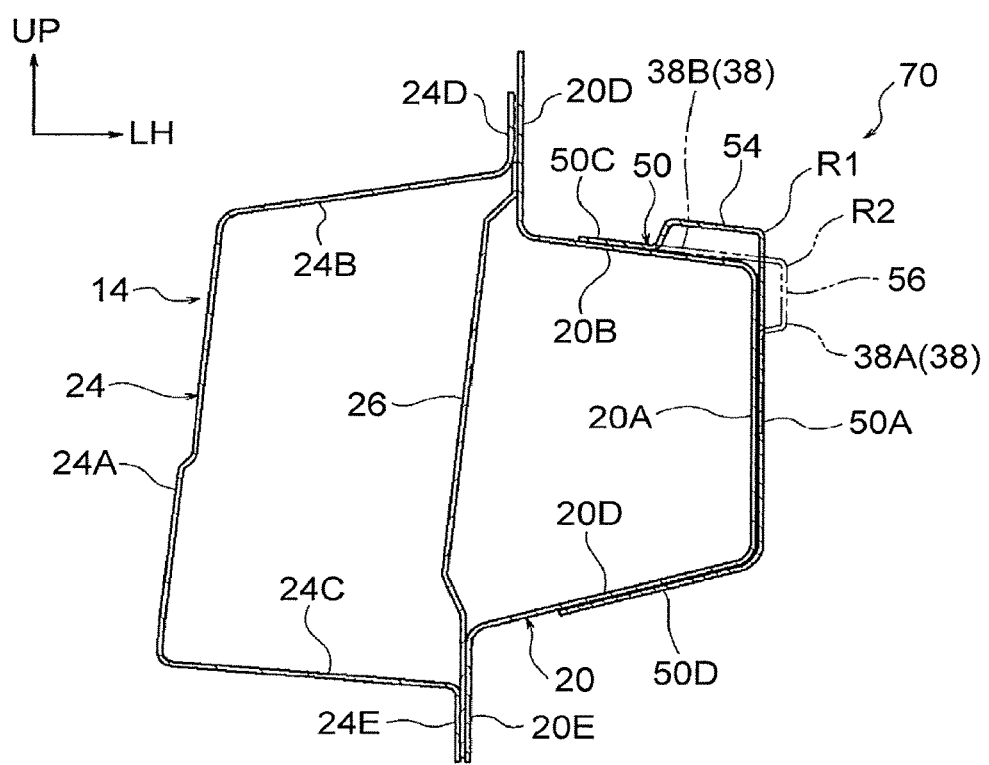
FIG. 15 is a cross-sectional view showing a modification of the embodiment of the present disclosure and corresponding to part of FIG. 4.

<Supplementary Explanation of Embodiment> In the above-described embodiment, as a modification 70 shown in FIG. 15, part of a rear end 51 of an A-pillar RF 50 and part of a front end 39 of a rocker outer RF 38 may be configured to cross each other in a vehicle front view. In the modification 70, the rear end side of a rear wall portion 50C of the A-pillar RF 50 is bent in a crank shape in a vehicle front view so that a stepped portion 54 protruding toward the vehicle upper side is formed on the rear end side and the outer side in the vehicle width direction of the rear wall portion 50C. Further, the front end side of a side wall portion 38A of the rocker outer RF 38 is bent in a crank shape in a vehicle front view so that a stepped portion 56 protruding outward in the vehicle width direction is formed on the front end side and the upper end side of the side wall portion 38A. Consequently, part of the rear-end ridge line portion R1 side of the A-pillar RF 50 at the rear end 51 and part of the front-end ridge line portion R2 side of the rocker outer RF 38 at the front end 39 are configured to cross each other in a vehicle front view. In this modification, compared to the configuration with no crossing as described above, the setting (design and manufacture of respective members, etc.) for contacting the rear end 51 of the A-pillar RF 50 and the front end 39 of the rocker outer RF 38 with each other on the ridge line portion R1, R2 sides when a collision load F (see FIG. 7) is input to an A-pillar 16 is facilitated. In other words, regardless of an input direction offset of the collision load F, dimensional errors of the reinforcements 38 and 50, attaching errors of the reinforcements 38 and 50 with respect to a rocker outer panel 20, or the like, it is possible to surely contact the rear end 51 and the front end 39 with each other. Further, the state where the rear end 51 and the front end 39 are in contact with each other cannot easily be released unexpectedly.

In the above-described embodiment, it is configured that the gap 52 is provided between the rear end 51 of the A-pillar RF 50 and the front end 39 of the rocker outer RF 38. However, the present disclosure is not limited thereto. That is, it may be configured that the rear end 51 of the A-pillar RF 50 and the front end 39 of the rocker outer RF 38 are disposed so as to be normally in contact with each other.

In the above-described embodiment, the description has been given of the case where, in the vehicle 12 to which the vehicle lower portion structure 10 is applied, the configurations of the left side portion and the right side portion of the vehicle body are the same except that they are bilaterally symmetrical. However, the present disclosure is not limited thereto. That is, it may be configured that the vehicle lower portion structure according to the present disclosure is applied to only one of the left side portion and the right side portion of the vehicle body.

In the above-described embodiment, it is configured that the lower end portion 50U of the A-pillar RF 50 and the rocker outer RF 38 are joined to the rocker outer panel 20. However, the present disclosure is not limited thereto. That is, for the present disclosure, it is satisfactory if a lower end portion of a front pillar reinforcement and a rocker reinforcement are joined to a common panel forming a rocker.

In addition, the present disclosure can be carried out with various changes within a range not departing from the gist thereof. Naturally, the scope of rights of the present disclosure is not limited to the above-described embodiment.

What is claimed is:

1. A vehicle lower portion structure comprising:
   a front pillar reinforcement provided to a front pillar and including a lower end portion joined to a panel forming a rocker, and the rocker forms a closed cross section; and
   a rocker reinforcement provided to the rocker, joined to the panel on an outer side of the closed cross section of the rocker, and including a front end, the front end disposed to face a rear end of the lower end portion from a vehicle rear side, wherein when a collision load is input from a vehicle front side to at least the front pillar, the rear end comes in contact with the front end.

2. The vehicle lower portion structure according to claim 1, wherein
   the front end and the rear end are normally spaced apart from each other by a gap.

3. The vehicle lower portion structure according to claim 1, wherein
   a rear-end ridge line portion extending in a vehicle longitudinal direction is formed on a rear end side of the lower end portion, and
   the rocker reinforcement is formed with a front-end ridge line portion extending in the vehicle longitudinal direction, and at least part of the rear-end ridge line portion side at the rear end and at least part of the front-end ridge line portion side at the front end normally overlap each other in a vehicle front view.

4. The vehicle lower portion structure according to claim 1, wherein
   part of the front end and part of the rear end normally cross each other in a vehicle front view.

5. The vehicle lower portion structure according to claim 1, wherein the panel forming the rocker is a rocker outer panel, and the rocker reinforcement is a rocker outer reinforcement overlapped with the rocker outer panel on the outer side in a vehicle width direction.

* * * * *